US008776037B2

(12) United States Patent
Gee et al.

(10) Patent No.: US 8,776,037 B2
(45) Date of Patent: Jul. 8, 2014

(54) APPARATUS AND METHOD TO UPDATE MULTIPLE DEVICES DISPOSED IN A COMPUTING SYSTEM

(75) Inventors: Lourdes Magally Gee, Tucson, AZ (US); Jason James Graves, Tucson, AZ (US); Kevan D. Holdaway, Tucson, AZ (US); David Michael Morton, Tucson, AZ (US); Ivan Ronald Olguin, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1715 days.

(21) Appl. No.: 11/619,984

(22) Filed: Jan. 4, 2007

(65) Prior Publication Data

US 2008/0168434 A1    Jul. 10, 2008

(51) Int. Cl.
*G06F 9/44* (2006.01)
*G06F 9/445* (2006.01)

(52) U.S. Cl.
USPC .......... 717/168; 717/171; 717/172; 717/173; 717/174; 717/178; 717/176; 717/177

(58) Field of Classification Search
None
See application file for complete search history.

(56) References Cited

U.S. PATENT DOCUMENTS

| 5,581,712 | A  | * | 12/1996 | Herrman ................. 710/302 |
| 5,841,991 | A  | * | 11/1998 | Russell .................. 709/221 |
| 5,907,689 | A  | * | 5/1999  | Tavallaei et al. .......... 710/110 |
| 5,999,743 | A  | * | 12/1999 | Horan et al. ............. 710/56 |
| 6,205,547 | B1 | * | 3/2001  | Davis .................... 713/1 |
| 6,266,809 | B1 | * | 7/2001  | Craig et al. ............. 717/173 |
| 6,393,586 | B1 | * | 5/2002  | Sloan et al. ............. 714/25 |
| 6,823,463 | B1 | * | 11/2004 | Challener et al. ......... 726/5 |
| 6,944,854 | B2 |   | 9/2005  | Kehne et al. |
| 6,971,002 | B2 |   | 11/2005 | Austen et al. |
| 7,089,547 | B2 | * | 8/2006  | Goodman et al. ......... 717/168 |
| 7,293,169 | B1 | * | 11/2007 | Righi et al. ............. 713/2 |
| 7,421,688 | B1 | * | 9/2008  | Righi et al. ............. 717/172 |
| 7,480,905 | B2 | * | 1/2009  | Nagao .................... 717/171 |
| 7,865,890 | B2 | * | 1/2011  | Sumi et al. .............. 717/169 |
| 8,024,724 | B2 | * | 9/2011  | Garrison Stuber et al. ... 717/172 |
| 8,081,596 | B1 | * | 12/2011 | Buracchini et al. ........ 370/328 |
| 2002/0046265 | A1 | * | 4/2002 | Suzuki ................... 709/220 |
| 2002/0092008 | A1 | * | 7/2002 | Kehne et al. ............. 717/168 |
| 2003/0005068 | A1 | * | 1/2003 | Nickel et al. ............ 709/208 |
| 2003/0088655 | A1 | * | 5/2003 | Leigh et al. ............. 709/223 |
| 2003/0135683 | A1 | * | 7/2003 | Moy ...................... 710/305 |
| 2003/0191823 | A1 | * | 10/2003 | Bansal et al. ............ 709/220 |
| 2003/0217358 | A1 | * | 11/2003 | Thurston et al. .......... 717/174 |
| 2004/0045000 | A1 | * | 3/2004 | Hara ..................... 717/178 |
| 2004/0093592 | A1 |   | 5/2004 | Rao |
| 2004/0230963 | A1 | * | 11/2004 | Rothman et al. ........... 717/168 |

(Continued)

*Primary Examiner* — Insun Kang
(74) *Attorney, Agent, or Firm* — Dale F. Regelman; Quarles & Brady LLP (57) ABSTRACT

A method is disclosed to update multiple devices disposed in a computing system comprising a plurality of devices. The method receives a request to perform a firmware image update for a plurality of designated target devices, where each of those designated target devices comprises a first firmware image, and where the request comprises a second firmware image. The method uploads the second firmware image to a shared memory device, where each of the designated target devices is in communication with that shared memory device, and broadcasts an update command to each of the plurality of devices. The method determines the device state of each of the designated target devices, and if each of the designated target devices reports either an operational device state or an error device state, then the method reports that the firmware update is complete.

17 Claims, 5 Drawing Sheets

(56) References Cited

U.S. PATENT DOCUMENTS

| | | |
|---|---|---|
| 2005/0071837 A1* | 3/2005 | Butt et al. .................... 717/168 |
| 2005/0132351 A1* | 6/2005 | Randall et al. ................ 717/168 |
| 2005/0202808 A1 | 9/2005 | Fishman et al. |
| 2005/0229173 A1 | 10/2005 | Mihm et al. |
| 2006/0010437 A1* | 1/2006 | Marolia ....................... 717/168 |
| 2006/0015861 A1* | 1/2006 | Takata et al. ................. 717/168 |
| 2006/0053216 A1* | 3/2006 | Deokar et al. ................ 709/223 |
| 2006/0095536 A1* | 5/2006 | Mathieson et al. ........... 709/217 |
| 2006/0200813 A1* | 9/2006 | Young et al. ................. 717/168 |
| 2007/0169106 A1* | 7/2007 | Douglas et al. .............. 717/173 |
| 2007/0234132 A1* | 10/2007 | Lee ............................... 714/57 |
| 2007/0234332 A1* | 10/2007 | Brundridge et al. .......... 717/168 |
| 2008/0005733 A1* | 1/2008 | Ramachandran et al. .... 717/168 |
| 2008/0052702 A1* | 2/2008 | Chuang ........................ 717/170 |
| 2008/0098160 A1* | 4/2008 | Slyz et al. .................... 711/103 |
| 2008/0127165 A1* | 5/2008 | Mullis et al. ................. 717/173 |
| 2008/0141236 A1* | 6/2008 | Buckler et al. ............... 717/168 |
| 2008/0155526 A1* | 6/2008 | Gokhale ....................... 717/169 |
| 2010/0050168 A1* | 2/2010 | Sharonov ..................... 717/173 |
| 2011/0258296 A1* | 10/2011 | Garrison Stuber et al. ... 709/219 |

* cited by examiner

APPARATUS AND METHOD TO UPDATE MULTIPLE DEVICES DISPOSED IN A COMPUTING SYSTEM

FIELD OF THE INVENTION

This invention relates to an apparatus and method to update multiple devices disposed in a computing system.

BACKGROUND OF THE INVENTION

Computing systems generate information, access information, and store information, using a plurality of hardware components, where each of those hardware components comprise one or more devices. Those devices generally comprise a processor and a firmware image comprising microcode, instructions, and the like. The processor utilizes the firmware image to operate the device.

Every so often it is necessary to update the firmware image disposed in a plurality of target devices disposed in the computing system. Using prior art methods, the computing system operator must update each of the target devices one at a time. Such a firmware update process can be time inefficient.

SUMMARY OF THE INVENTION

What is needed is a method wherein a firmware update for a plurality of target devices is encoded to a memory device accessible to each of the target devices. Thereafter, each of the target devices can automatically install that firmware image update synchronously.

Applicants' invention comprises an apparatus and method to synchronously update the firmware image disposed in a plurality of devices disposed in a computing system. In response to a request to perform a firmware image update for a plurality of designated target devices, where each of those designated target devices comprises a first firmware image, and where the request comprises a second firmware image, the method uploads the second firmware image to a memory device, where each of the designated target devices can access that memory device, and broadcasts an update command to each of the plurality of devices. The method determines the device state of each of the designated target devices, and if each of the designated target devices reports either an operational device state or an error device state, then the method reports that the firmware update is complete.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention comprises a method to provide a firmware update to multiple devices disposed in a computing system. Applicants' invention is described herein in embodiments wherein a firmware image update is provided to a plurality of devices disposed in one or more hardware components, wherein each of those devices is directly or indirectly in communication with a management module.

In certain embodiments, such hardware components comprise interchangeable modules i.e. blades, removeably disposed in a variety of computer servers sold in commerce by IBM under the trademark BLADECENTER. In certain embodiments, such hardware components further comprise, for example one or more central processing units.

In certain embodiments, such hardware components include, for example and without limitation, one or more data storage devices, such as and without limitation, a magnetic disk storage device comprising the disk in combination with the firmware and hardware to read information from, and write information to, the disk; an optical disk storage device comprising the disk in combination with the firmware and hardware to read information from, and write information to, the disk; an electronic data storage medium; and the like.

Figure 1:
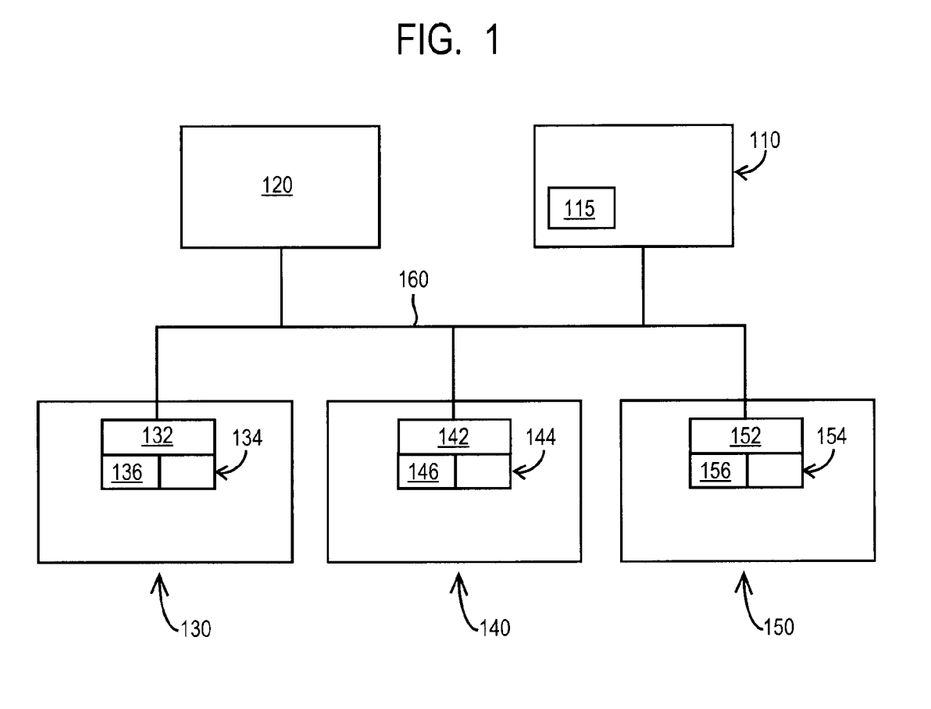
FIG. 1 is a block diagram showing a plurality of hardware components disposed in a computing system wherein each of those hardware components comprises a device.

Referring now to FIG. 1, hardware components 130, 140, and 150, communicate with shared memory 110 and management module 120 via I/O protocol 160.

In the illustrated embodiment of FIG. 1, firmware image update 115 is written to shared memory 110. I/O protocol 160 may comprise any type of I/O interface, for example, a Fibre Channel, Infiniband, Gigabit Ethernet, Ethernet, TCP/IP, iSCSI, SCSI I/O, and the like.

Hardware component 130 comprises device 132 which comprises memory 134, wherein firmware image 136 is written to memory 134. Hardware component 140 comprises device 142 which comprises memory 144, wherein firmware image 146 is written to memory 144. Hardware component 150 comprises device 152 which comprises memory 154, wherein firmware image 156 is written to memory 154.

In certain embodiments, one or more of memory 110, 134, 144, and 154, comprise RAM memory. In certain embodiments, one or more of shared memory 110, 134, 144, and 154, comprise one or more magnetic information storage media in combination with the hardware, firmware, and/or software to write information to, and read information from, those one or more magnetic information storage media. In certain embodiments, one or more of shared memory 110, 134, 144, and 154, comprise one or more optical information storage media in combination with the hardware, firmware, and/or software to write information to, and read information from, those one or more optical information storage media. In certain embodiments, one or more of shared memory 110, 134, 144, and 154, comprise one or more electronic information storage media in combination with the hardware, firmware, and/or software to write information to, and read information from, those one or more electronic information storage media. By "electronic information storage media," Applicants mean, for example and without limitation, one or more devices, such as and without limitation, a PROM, EPROM, EEPROM, Flash PROM, compactflash, smartmedia, and the like.

Figure 2:
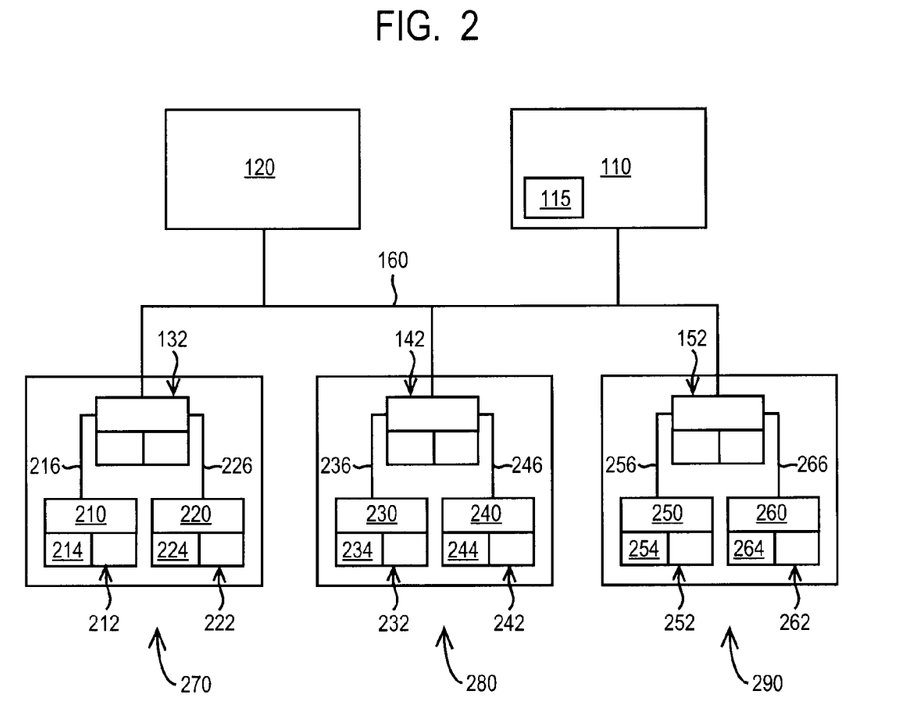
FIG. 2 is block diagram showing a plurality of hardware components disposed in a computing system wherein each of those hardware components comprises a master device in communication with two slave devices.

Referring now to FIG. 2, hardware component 270 comprises a master device 132 and slave devices 210 and 220. Master device 132 communicates the slave device 210 via I/O protocol 216. Master device 132 communicates the slave device 220 via I/O protocol 226. I/O protocols 216 and 226 may comprise any type of I/O interface, for example, a Fibre Channel, Infiniband, Gigabit Ethernet, Ethernet, TCP/IP, iSCSI, SCSI I/O, and the like. Device 210 comprises memory 212 with firmware image 214 written to memory 212. Device 220 comprises memory 222 with firmware image 224 written to memory 222.

Slave devices 210 and 220 can access shared memory 110 directly. Slave devices 210 and 220 communicate indirectly with management module 120 (FIGS. 1, 2). In certain embodiments, "communicate indirectly" means that the master device 132 passes through signals from management module to slave device 210, and/or slave device 220, and similarly passes through signals from slave device 210, and/or slave device 220, to management module 120 (FIGS. 1, 2).

In certain embodiments, "communicate indirectly" means that master device 132 receives signals from management module directed to slave device 210 and/or slave device 220, and rebroadcasts those signals to slave device 210 and/or slave device 220. Similarly in these embodiments, master device 132 receives signals from slave device 210, and/or slave device 220, directed to management module 120, and rebroadcasts those signals to management module 120.

In the illustrated embodiment of FIG. 2, hardware component 280 comprises a master device 142 and slave devices 230 and 240. Master device 142 communicates the slave device 230 via I/O protocol 236. Master device 142 communicates the slave device 240 via I/O protocol 246. Slave devices 230 and 240 communicate indirectly, as described hereinabove, with management module 120 (FIGS. 1, 2). Slave devices 230 and 240 can access shared memory 110 directly.

I/O protocols 236 and 246 may comprise any type of I/O interface, for example, a Fibre Channel, Infiniband, Gigabit Ethernet, Ethernet, TCP/IP, iSCSI, SCSI I/O, and the like. Device 230 comprises memory 232 with firmware image 234 written to memory 232. Device 240 comprises memory 242 with firmware image 244 written to memory 242.

In the illustrated embodiment of FIG. 2, hardware component 290 comprises a master device 152 and slave devices 250 and 260. Master device 152 communicates the slave device 250 via I/O protocol 256. Master device 152 communicates the slave device 260 via I/O protocol 266. Slave devices 250 and 260 communicate indirectly with management module 120 (FIGS. 1, 2). Slave devices 250 and 260 can access shared memory 110 directly.

I/O protocols 256 and 266 may comprise any type of I/O interface, for example, a Fibre Channel, Infiniband, Gigabit Ethernet, Ethernet, TCP/IP, iSCSI, SCSI I/O, and the like. Device 250 comprises memory 252 with firmware image 254 written to memory 252. Device 260 comprises memory 262 with firmware image 264 written to memory 262.

In certain embodiments, one or more of memory 212, 222, 232, 242, 252, and 262, comprise RAM memory. In certain embodiments, one or more of memory 212, 222, 232, 242, 252, and 262, comprise one or more magnetic information storage media in combination with the hardware, firmware, and/or software to write information to, and read information from, those one or more magnetic information storage media. In certain embodiments, one or more of memory 212, 222, 232, 242, 252, and 262, comprise one or more optical information storage media in combination with the hardware, firmware, and/or software to write information to, and read information from, those one or more optical information storage media. In certain embodiments, one or more of memory 212, 222, 232, 242, 252, and 262, comprise one or more electronic information storage media in combination with the hardware, firmware, and/or software to write information to, and read information from, those one or more electronic information storage media. By "electronic information storage media," Applicants mean, for example and without limitation, one or more devices, such as and without limitation, a PROM, EPROM, EEPROM, Flash PROM, compactflash, smartmedia, and the like.

Figure 3:
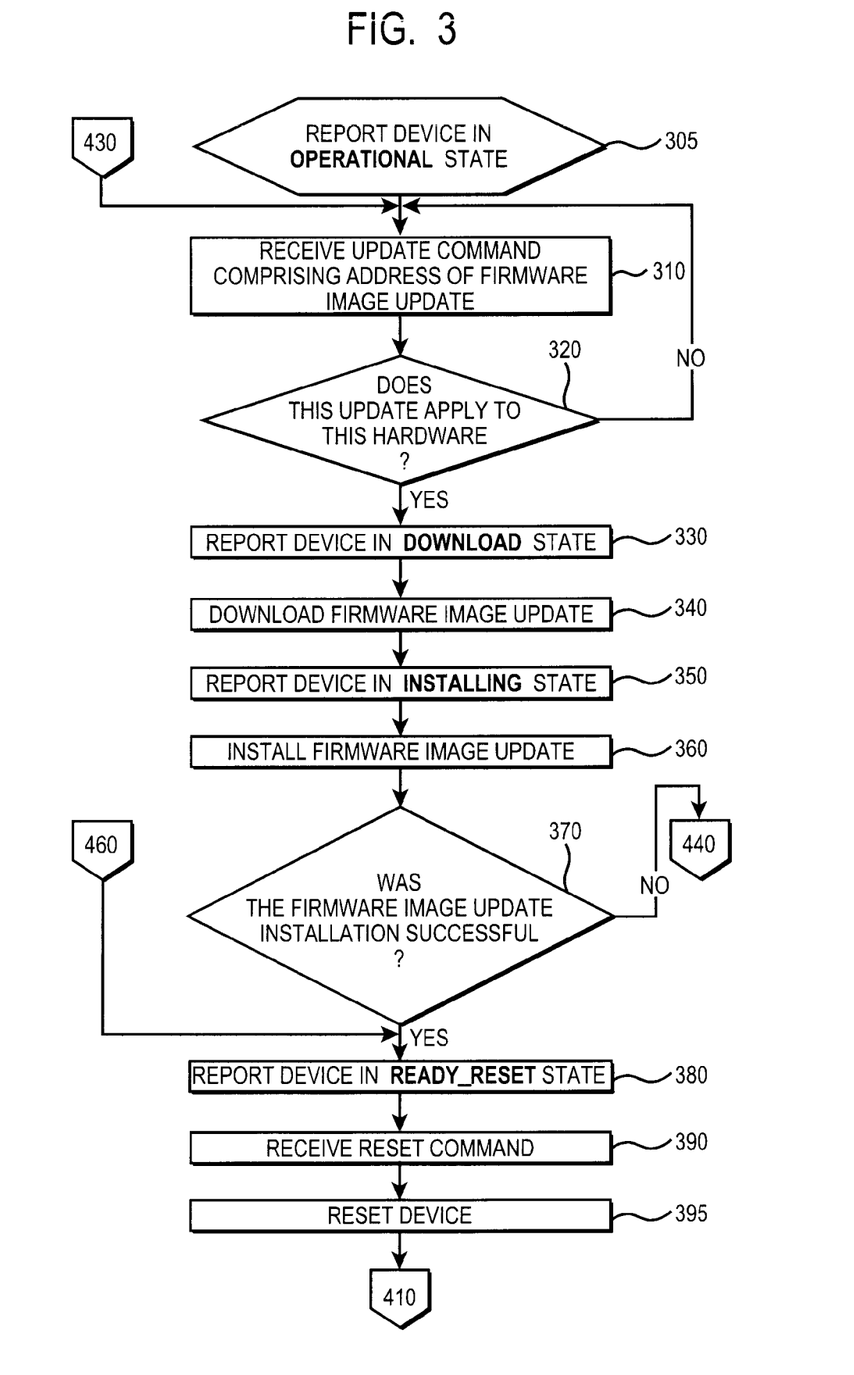
FIG. 3 is a flow chart summarizing certain steps of Applicants' method.
Figure 4:
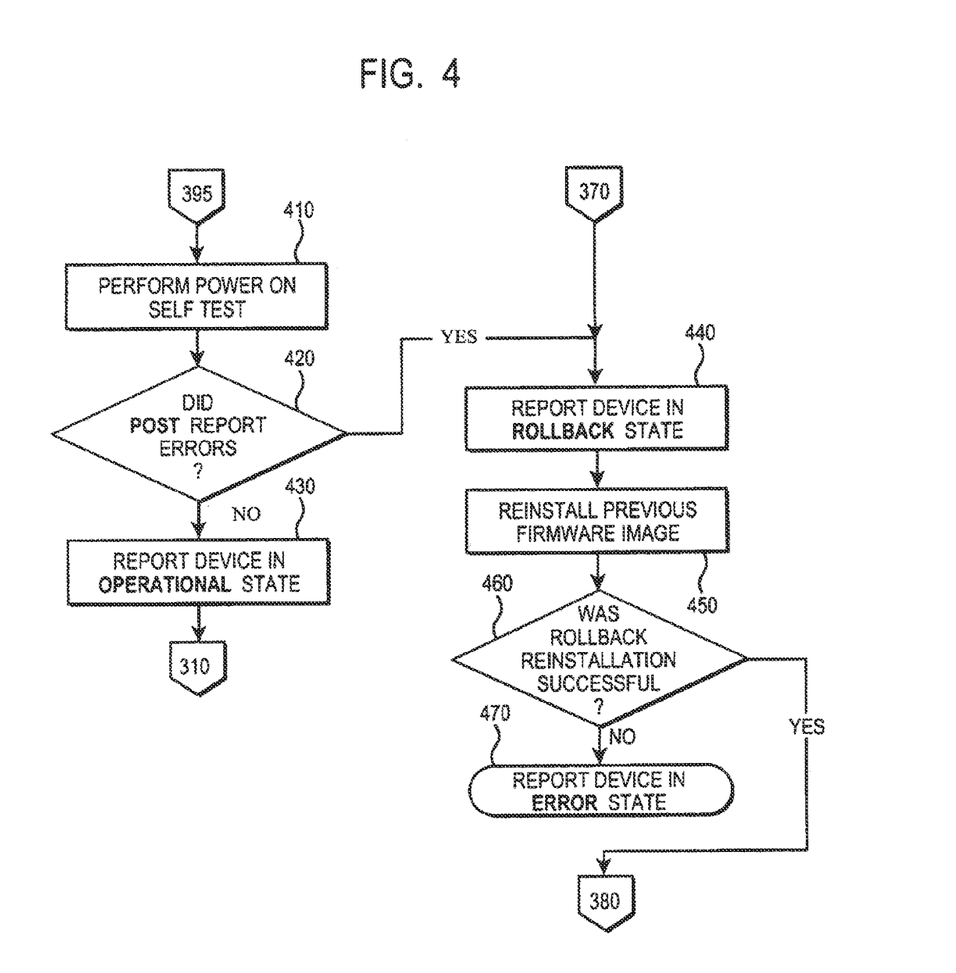
FIG. 4 is a flow chart summarizing additional steps of Applicants' method.

Applicants' invention comprises a method to provide a firmware image update to multiple devices. FIGS. 3 and 4 summarize the steps of Applicants' method executed by a plurality of devices disposed in a computing system. Referring now to FIG. 3, in step 305 Applicants' method provides a computing system, wherein that computing system comprises a plurality of devices. Further in step 305, one or more of the devices disposed in one or more of those hardware components reports an OPERATIONAL device state. In certain embodiments, one or more of those devices reports such an OPERATIONAL device state to a management module, such as for example and without limitation, Applicants' management module 120 (FIGS. 1, 2). In certain embodiments, the reporting of step 305 is performed by a processor disposed in one or more of devices 130 (FIG. 1), 140 (FIG. 1), 150 (FIG. 1), 270 (FIG. 2), 280 (FIG. 2), and 290 (FIG. 2).

In step 310, each device disposed in the computing system of step 305 receives an update command. In certain embodiments, the update command of step 310 is communicated directly or indirectly, to each device by a management module, such as and without limitation management module 120 (FIGS. 1, 2). In certain embodiments, the update command of step 310 comprises a listing of target devices. In certain embodiments, the update command of step 310 comprises a storage address wherein a firmware image update, such as firmware image update 115 (FIGS. 1, 2) can be retrieved from shared memory 110 (FIGS. 1, 2).

In step 320, each device disposed in the computing system of step 305 determines if the update command of step 310 applies to that device. In certain embodiments, step 320 is performed by a processor disposed in each of the devices disposed in the computing system.

If a device determines in step 320 that the update command of step 310 does not apply, then that device continues to monitor for further update commands. Alternatively, if a device determines in step 320 that the update command of step 310 does apply to that component, then Applicants' method transitions from step 320 to step 330 wherein that device reports a DOWNLOAD device state. In certain embodiments, the reporting of step 330 is communicated, directly or indirectly, to a management module, such as and without limitation Applicants' management module 120 (FIGS. 1, 2). In certain embodiments, step 330 is performed by a processor disposed in each of the devices disposed in Applicants' computing system, where that device determined in step 320 that the download command of step 310 applied to the device.

Applicants' method transitions from step 330 to step 340 wherein each device reporting a DOWNLOAD device state in step 330 downloads a firmware image update, such as firmware image update 115 (FIGS. 1, 2). In certain embodiments, that firmware image update has been written to a memory, such as shared memory 110 (FIGS. 1, 2), accessible to each device disposed in the computing system of step 305. In certain embodiments, step 340 comprises retrieving the firmware image update from shared memory 110, and writing that firmware image update to memory disposed in each device making the status report of step 330, for example and without limitation memory 134 (FIG. 1), 144 (FIG. 1), 154 (FIG. 1), 212 (FIG. 2), 222 (FIG. 2), 232 (FIG. 2), 242 (FIG. 2), 252 (FIG. 2), and/or 262 (FIG. 2). In certain embodiments, the existing firmware image 136 (FIG. 1), 146 (FIG. 1), 156 (FIG. 1), 214 (FIG. 2), 224 (FIG. 2), 234 (FIG. 2), 244 (FIG. 2), 254 (FIG. 2), and/or 264 (FIG. 2), is not overwritten in step 340.

Each device downloading a firmware image in step 340 reports an INSTALLING device state in step 350. In certain embodiments, each of devices that downloaded a firmware image in step 340 communicates, directly or indirectly, to a management module an INSTALLING device state in step 350. In certain embodiments, the reporting of step 350 is performed by a processor disposed in each of the devices disposed in Applicants' computing system that downloaded a firmware image in step 340.

In step 360, each device that reports an INSTALLING device state in step 350 installs the firmware image update downloaded in step 340. In certain embodiments, step 360 is performed by a processor disposed in each of the devices disposed in Applicants' computing system that downloaded a firmware image update in step 340.

In step 370, each device that installed a firmware image update in step 360 determines if that installation was successful. In certain embodiments, step 370 is performed by a processor disposed in each of the devices disposed in Applicants' computing system that installed a firmware image in step 360.

For each device that determines in step 370 that the installation of step 360 was not successful, Applicants' method transitions from step 370 to step 440 (FIG. 4). Alternatively, for each device that determines in step 370 that the installation of step 360 was successful, Applicants' method transitions from step 370 to step 380 wherein the device reports a READY_RESET device state. In certain embodiments, each of devices disposed in Applicants' computing system that determined in step 370 that the installation of step 360 was successful communicates, directly or indirectly, to a management module in a READY_RESET device state in step 380. In certain embodiments, the reporting of step 380 is performed by a processor disposed in each of the devices disposed in Applicants' computing system that successfully installed a firmware image in step 360.

In step 390, each device that reported in step 380 a successful firmware image installation receives a reset command. In certain embodiments, the reset command of step 390 is communicated, directly or indirectly, by a management module, such as and without limitation Applicants' management module 120 (FIGS. 1, 2).

In step 395, each device that that received a reset command in step 390 performs a device reset. In certain embodiments, step 395 is performed by a processor disposed in received a reset command in step 390. In certain embodiments, step 390 comprises rebooting the device. In certain embodiments, step 390 comprises interrupting, and then resuming, the supply of power to the device.

Applicants' method transitions from step 395 to step 410 (FIG. 4). Referring now to FIG. 4, each device that performed a device reset in step 395 performs a Power On Self Test ("POST") in step 410. In certain embodiments, step 410 is performed by a processor disposed in each of the devices disposed in Applicants' computing system, where that device performed a reset command in step 395.

Each device that performed a Power On Self Test ("POST") in step 410 determines in step 420 if that Power On Self Test reported errors. In certain embodiments, step 420 is performed by a processor disposed in each of the devices disposed in Applicants' computing system, where device performed a Power On Self Test in step 410.

For each device that determines in step 420 that the Power On Self Test of step 410 reported errors, Applicants' method transitions from step 420 to step 440. Alternatively, for each device that determines in step 420 that the Power On Self Test of step 410 did not report errors, Applicants' method transitions from step 420 to step 430 wherein that device reports an OPERATIONAL device state.

In certain embodiments, each of devices that determined in step 420 that the Power On Self Test of step 410 did not report errors, communicates, directly or indirectly, an OPERATIONAL device state to a management module in step 430. In certain embodiments, the reporting of step 430 is performed by a processor disposed in each of the devices disposed in Applicants' computing system that determined in step 420 that the Power On Self Test of step 410 did not report errors. Applicants' method transitions from step 430 to step 310 and continues as described herein.

Each device that determines in step 370 that the installation of step 360 was not successful, and each device that determines in step 420 that the Power On Self Test of step 410 reported errors, in step 440 reports a ROLLBACK device state. In certain embodiments, the reporting of step 440 is communicated, directly or indirectly, to a management module, such as and without limitation Applicants' management module 120 (FIGS. 1, 2). In certain embodiments, the reporting of step 430 is performed by a processor disposed in each of the devices disposed in Applicants' computing system that determined in step 370 that the firmware installation of step 360 was not successful, or that determined in step 420 that the Power On Self Test of step 410 reported errors.

In step 450, each device that reported a ROLLBACK device state in step 440 reinstalls the previous firmware image. As an example, if device 132 (FIG. 1) reported a ROLLBACK device state in step 440, then in step 450 device 132 reinstalls firmware image 136 (FIG. 1).

In step 460, each device that reinstalled a previous firmware image in step 450 determines if that reinstallation was successful. In certain embodiments, step 460 is performed by a processor disposed in each of the devices disposed in Applicants' computing system, where that data storage assembly reinstalled a previous firmware For each device that determines in step 460 that the firmware reinstallation of step 450 was successful, Applicants' method transitions from step 460 to step 380 and continues as described herein. Alternatively, for each device that determines in step 460 that the firmware reinstallation of step 450 was not successful, Applicants' method transitions from step 460 to step 470 wherein that device reports an ERROR device state. In certain embodiments, the reporting of step 470 is communicated, directly or indirectly, to a management module, such as and without limitation Applicants' management module 120 (FIGS. 1, 2). In certain embodiments, the reporting of step 470 is performed by a processor disposed in each of the devices disposed in Applicants' computing system that determined in step 360 that the firmware reinstallation of step 450 was not successful.

Figure 5:
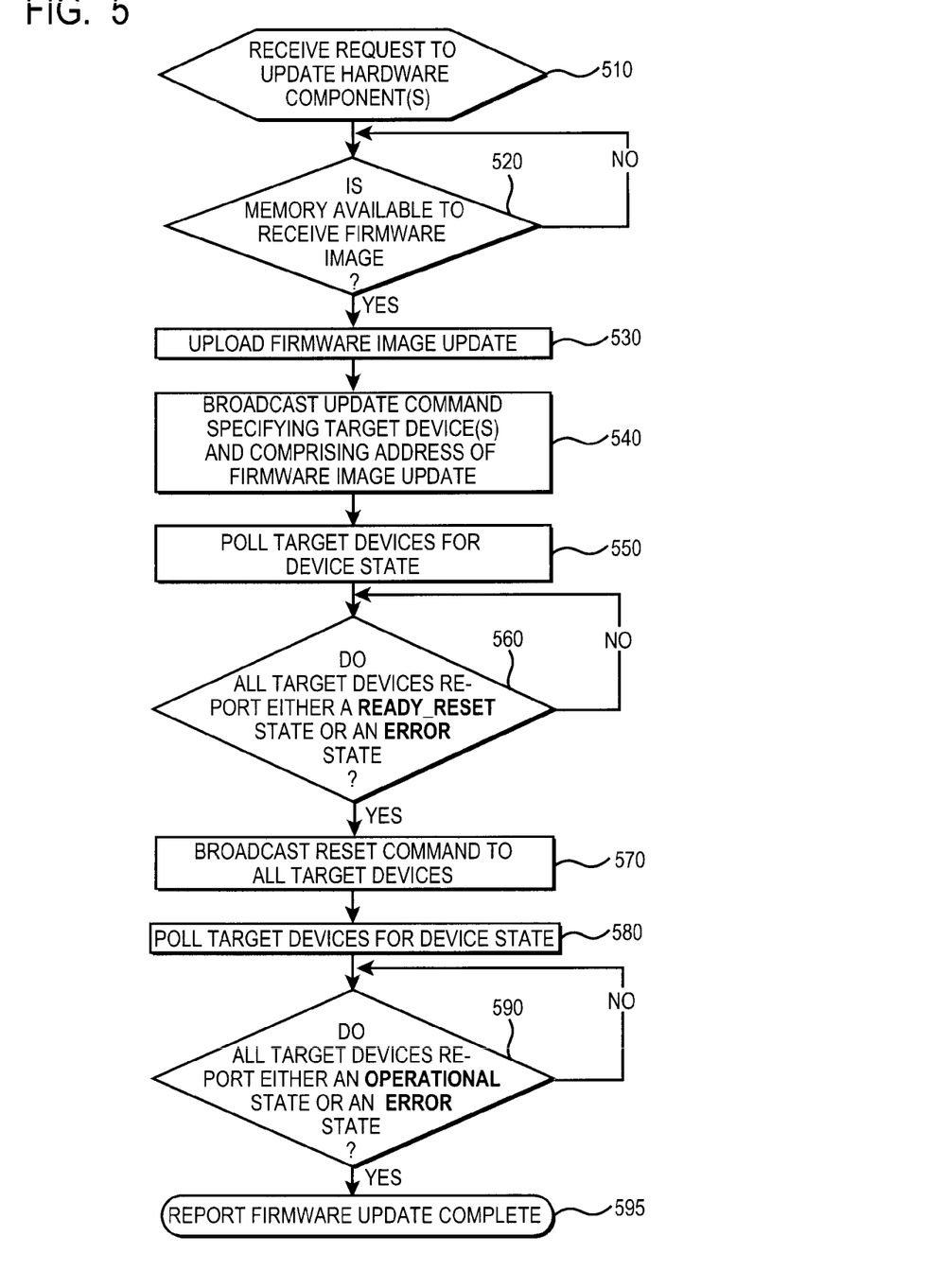
FIG. 5 is a flow chart summarizing additional steps of Applicants' method.

FIG. 5 summarizes the steps of Applicants' method executed by a management module disposed in the computing system of step 305 (FIG. 3). Referring now to FIG. 5, in step 510 a computing system receives request to install a firmware image update. In certain embodiments, the request of step 510 Applicants' designates one or more target devices. In certain embodiments, the request of step 510 is received by a management module, such as for example and without limitation Applicants' management module 120 (FIGS. 1, 2).

In step 520, Applicants' method determines if sufficient memory is available to download the firmware image update of step 510. In certain embodiments, step 520 is performed by a management module, such as for example and without limitation If Applicants' method determines in step 520 that insufficient memory is available to receive the firmware image update, then the method continues to monitor the system to locate sufficient memory. Alternatively, if Applicants' method determines that sufficient memory is available, then the method transitions from step 520 to step 530 wherein the method uploads the firmware image update. In certain embodiments, step 530 is performed by a management module, such as for example and without limitation Applicants' management module 120 (FIGS. 1, 2).

In step 540, Applicants' method broadcasts, directly or indirectly, an update command to all the devices disposed in the computing system of step 510. In certain embodiments, the broadcast of step 540 designates one or more target devices to be updated with the firmware image update. In certain embodiments, the broadcast of step 540 comprises a storage address for, and the size of, the firmware image update. In certain embodiments, step 540 is performed by a management module, such as for example and without limitation Applicants' management module 120 (FIGS. 1, 2).

In step 550, Applicants' method polls, directly or indirectly, each target device for its device state. In certain embodiments, a device state is selected from the group consisting of OPERATIONAL, DOWNLOAD, INSTALLING, READY_RESET, ROLLBACK, and ERROR. In certain embodiments, step 550 is performed by a management module, such as for example and without limitation Applicants' management module 120 (FIGS. 1, 2).

In step 560, Applicants' method determines if all the target devices report either a READY_RESET device state or an ERROR device state. In certain embodiments, step 560 is performed by a management module, such as for example and without limitation Applicants' management module 120 (FIGS. 1, 2). If Applicants' method determines in step 560 that all the target devices do not report either a READY_RESET device state or an ERROR device state, then the method continues to monitor the device state of each of the target devices.

Alternatively, if Applicants' method determines in step 560 that all the target devices do report either a READY_RESET device state or an ERROR device state, then the method transitions from step 560 to step 570 wherein the method broadcasts, directly or indirectly, a reset command to all the target devices. In certain embodiments, step 570 is performed by a management module, such as for example and without limitation Applicants' management module 120 (FIGS. 1, 2).

In step 580, Applicants' method polls, directly or indirectly, each of the target devices for a device state. In certain embodiments, step 580 is performed by a management module, such as for example and without limitation Applicants' management module 120 (FIGS. 1, 2).

In step 590, Applicants' method determines if all the target devices report either a READY_RESET device state or an ERROR device state. In certain embodiments, step 590 is performed by a management module, such as for example and without limitation Applicants' management module 120 (FIGS. 1, 2). If Applicants' method determines in step 590 that all the target devices do not report either a READY_RESET device state or an ERROR device state, then the method continues to monitor the status of each of the target devices.

Alternatively, if Applicants' method determines in step 590 that all the target devices do report either a READY_RESET device state or an ERROR device state, then the method transitions from step 590 to step 595 wherein the method reports that the firmware update is complete. In certain embodiments, step 595 is performed by a management module, such as for example and without limitation Applicants' management module 120 (FIGS. 1, 2). In certain embodiments, the report of step 595 is made to the requestor of step 510.

In certain embodiments, individual steps recited in FIG. 3 and/or FIG. 4, may be combined, eliminated, or reordered.

In certain embodiments, Applicants' invention includes instructions residing in memory, such as for example memory 134 (FIG. 1), 144 (FIG. 1), and 154 (FIG. 1), 212, 222, 232, 242, 252, 262, disposed in a device, such as device 132, 142, 152, 210, 220, 230, 240, 250, and 260, respectively, wherein those instructions are executed by a processor disposed in that device to perform one or more of steps 305, 310, 320, 330, 340, 350, 360, 370, 380, 390, and/or 395, recited in FIG. 3, and/or one or more of steps 410, 420, 430, 440, 450, 460, and/or 470, recited in FIG. 4.

In certain embodiments, Applicants' invention includes instructions residing in memory, such as for example shared memory 110 (FIGS. 1, 2), wherein those instructions are executed by a processor disposed in a management module, such as management module 120, to perform one or more of steps 510, 520, 530, 540, 550, 560, 570, 580, 590, and/or 595, recited in FIG. 5.

In other embodiments, Applicants' invention includes instructions residing in any other computer program product, where those instructions are executed by a computer external to, or internal to, system 100, to perform one or more of steps 305, 310, 320, 330, 340, 350, 360, 370, 380, 390, and/or 395, recited in FIG. 3, and/or one or more of steps 410, 420, 430, 440, 450, 460, and/or 470, recited in FIG. 4, and/or one or more of steps 510, 520, 530, 540, 550, 560, 570, 580, 590, and/or 595, recited in FIG. 5. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to update multiple devices disposed in a computing system, comprising the steps of:

supplying a computing system comprising a management device and a plurality of hardware components, wherein each of said plurality of hardware components comprises a master device comprising a processor and in direct communication with said management device; and at least two slave devices each comprising a processor and a first firmware image and in communication with said master device;

receiving by said management device a request to perform a firmware update comprising a storage address for a second firmware image;

uploading said second firmware image to a shared memory device, wherein said master device and each slave device is in direct communication with said shared memory device;

broadcasting by said management device an update command to said master device;

rebroadcasting said update command by said master device to each interconnected slave device;

receiving by said master device slave device status signals from an interconnected slave device;

rebroadcasting to said management device by said master device said slave device status signals;

synchronously installing said second firmware image by said master device and by each of said plurality of slave devices.

2. The method of claim 1, further comprising after said broadcasting step and before said determining step:

ascertaining the device state of each of said plurality of slave devices, wherein said device state is selected from the group consisting of operational, download, installing, ready_reset, rollback, and error;

if each of said plurality of slave devices comprises either an operational device state or an error device state, broadcasting a reset command to each of said plurality of slave devices.

3. The method of claim 1, further comprising the steps of:

receiving by a first slave device said update command from an interconnected master device;

downloading said second firmware image by said first slave device;

reporting to said interconnected master device by said first slave device an installing device state; and performing a second firmware image installation by said first slave device.

4. The method of claim 3, further comprising the steps of:

determining by said first slave device if said second firmware image installation was successful;

if said first slave device determines that said second firmware image installation was successful, reporting to an interconnected master device by said first slave device a ready-reset device state.

5. The method of claim 4, further comprising the steps of:

receiving a reset command by said first slave device;

resetting said first slave device;

performing a power on self-test by said first slave device;

determining by said first slave device if said power on self-test reported errors;

if said power on self-test did not report errors, reporting to said interconnected master vice an operational device state by said first slave device.

6. The method of claim 5, further comprising the steps of:

if said first slave device determines that said second firmware image installation was not successful or if said first device determines that said power on self-test reported errors, reporting to said interconnected master device by said first slave device a rollback device state;

and performing a first firmware image reinstallation by said first slave device.

7. The method of claim 6, further comprising the steps of:

determining by said first slave device if said first firmware image reinstallation was successful;

if said first firmware image reinstallation was not successful, reporting to said interconnected master device by said first slave device an error device state.

8. An article of manufacture comprising a management device and a plurality of hardware components, wherein each of said plurality of hardware components comprises a management device and a plurality of hardware components, wherein each of said plurality of hardware components comprises a master device comprising a processor and in direct communication with said management device; and at least two slave devices each comprising a processor and a first firmware image and in communication with said master device, the computer readable program code comprising a series of computer readable program steps to effect:

receiving by said management device a request to perform a firmware update comprising a storage address for a second firmware image;

uploading said second firmware image to a shared memory device, wherein said master device and each slave device is in direct communication with said shared memory device;

broadcasting by said management device an update command to said master device;

rebroadcasting said update command by said master device to each interconnected slave device;

receiving by said master device slave device status signals from each interconnected slave device;

rebroadcasting to said management device by said master device said slave device status signals;

synchronously installing said second firmware image by said master device and by each of said plurality of slave devices.

9. The article of manufacture of claim 8, said computer readable program code further comprising a series of computer readable program steps to effect for each of said master and slave devices:

determining if said second firmware image installation was successful;

if said second firmware image installation was successful, reporting a ready-reset device state.

10. The article of manufacture of claim 9, said computer readable program code further comprising a series of computer readable program steps to effect, for each of said slave devices:

receiving a reset command;

resetting said article of manufacture;

performing a power on self-test;

determining if said power on self-test reported errors;

if said power on self-test did not report errors, reporting to an interconnected master device an operational device state.

11. The article of manufacture of claim 10, said computer readable program code further comprising a series of computer readable program steps to effect for each of said slave devices:

if said second firmware image installation was not successful or if said power on self-test reported errors, reporting to said interconnected master device a rollback device state; and performing a first firmware image reinstallation.

12. The article of manufacture of claim 11, said computer readable program code further comprising a series of computer readable program steps to effect for each of said slave devices:
- determining if said first firmware image reinstallation was successful;
- if said first firmware image reinstallation was not successful, reporting to said interconnected master device an error device state.

13. A computer program product encoded in a non-transitory information storage medium disposed in a computing system comprising a management device and a plurality of hardware components, wherein each of said plurality of hardware components comprises a master device comprising a processor and in direct communication with said management device, and at least two slave devices each comprising a processor and a first firmware image and in communication with said master device; wherein said computer program product is usable with a programmable computer processor to receive and install a firmware image update, comprising:
- computer readable program code which causes said programmable computer processor to receive by said management device a request to perform a firmware update comprising a storage address for a second firmware image;
- computer readable program code which causes said management device to broadcast an update command to said master device, wherein said master device and each slave device is in direct communication with a shared memory device;
- computer readable program code which causes said master device to rebroadcast said update command to each interconnected slave device;
- computer readable program code which causes said master device to receive slave device status signals from an interconnected slave device;
- computer readable program code which causes said master device to rebroadcast to said management device said slave device status signals;
- computer readable program code which causes each of said plurality of slave devices and said master device to synchronously install said second firmware image.

14. The computer program product of claim 13, further comprising:
- computer readable program code which causes said programmable computer processor to determine if said second firmware image installation was successful;
- computer readable program code which, if said second firmware image installation was successful, causes said programmable computer processor to report to an interconnected master device a ready-reset device state.

15. The computer program product of claim 14, further comprising:
- computer readable program code which causes said programmable computer processor to receive a reset command;
- computer readable program code which causes said programmable computer processor to reset each slave device;
- computer readable program code which causes said programmable computer processor to perform a power on self-test;
- computer readable program code which causes said programmable computer processor to determine if said power on self-test reported errors;
- computer readable program code which, if said power on self-test did not report errors, causes said programmable computer processor to report to said interconnected master device an operational device state.

16. The computer program product of claim 15, further comprising:
- computer readable program code which, if said second firmware image installation was not successful or if said power on self-test reported errors, causes said programmable computer processor to report to said interconnected master device a rollback device state; and
- computer readable program code which causes said programmable computer processor to perform a first firmware image reinstallation.

17. The computer program product of claim 16, further comprising:
- computer readable program code which causes said programmable computer processor to determine if said first firmware image reinstallation was successful;
- computer readable program code which, if said first firmware image reinstallation was not successful, causes said programmable computer processor to report to said interconnected master device an error device state.

* * * * *